(12) United States Patent
Gillett

(10) Patent No.: US 8,948,786 B2
(45) Date of Patent: Feb. 3, 2015

(54) DETERMINING A LOCATION OF A MOBILE USER TERMINAL

(71) Applicant: Microsoft Corporation, Redmond, WA (US)

(72) Inventor: Mark Alastair Gillett, London (GB)

(73) Assignee: Microsoft Corporation, Redmond, WA (US)

( * ) Notice: Subject to any disclaimer, the term of this patent is extended or adjusted under 35 U.S.C. 154(b) by 37 days.

(21) Appl. No.: 13/779,672

(22) Filed: Feb. 27, 2013

(65) Prior Publication Data

US 2014/0213283 A1    Jul. 31, 2014

(30) Foreign Application Priority Data

Jan. 28, 2013 (GB) .................................. 1301440.2

(51) Int. Cl.
*H04W 24/00* (2009.01)
*H04W 64/00* (2009.01)
*G01S 5/00* (2006.01)
*G01S 5/02* (2010.01)

(52) U.S. Cl.
CPC ............. *H04W 64/00* (2013.01); *G01S 5/0072* (2013.01); *G01S 5/0289* (2013.01)
USPC ....................................... 455/456.2; 370/328

(58) Field of Classification Search
CPC .............................. H04W 64/00; H04W 84/12
USPC ............ 455/456.1–456.5; 370/246, 313, 328, 370/338; 340/539.13; 342/357.28
See application file for complete search history.

(56) References Cited

U.S. PATENT DOCUMENTS

| 6,246,376 B1 | 6/2001 | Bork et al. |
| 7,084,809 B2 | 8/2006 | Hockley, Jr. et al. |

(Continued)

FOREIGN PATENT DOCUMENTS

| EP | 2523013 | 11/2012 |
| KR | 20120038296 | 4/2012 |

(Continued)

OTHER PUBLICATIONS

Hlavacs, et al., "Cooperative Positioning when using Local Position Information: Theoretical Framework and Error Analysis", Retrieved at <<http://ieeexplore.ieee.org/stamp/stamp.jsp?tp=&arnumber=6302138>>, IEEE Transactions on Mobile Computing, Jul. 2012, pp. 30.

(Continued)

*Primary Examiner* — Nathan Taylor
(74) *Attorney, Agent, or Firm* — Sonia Cooper; Jim Ross; Micky Minhas

(57) ABSTRACT

Apparatus comprising a decision processing module arranged to determine whether a first mobile user terminal and a second mobile user terminal are within a relative geographic proximity of one another, in dependence on a property of intermediate network equipment of a packet-switched network to which the first and second mobile user terminals are operable to connect. The apparatus also comprises a location processing module arranged to obtain a geographic location of the second mobile user terminal and, on condition that the first and second user terminals are determined to be within the proximity determined by the decision module, to use the geographic location of the second mobile user terminal in estimating a geographic location of the first mobile user terminal.

20 Claims, 2 Drawing Sheets

(56) References Cited

U.S. PATENT DOCUMENTS

| | | | |
|---|---|---|---|
| 8,616,975 B1* | 12/2013 | Saund et al. | 463/40 |
| 2006/0068811 A1* | 3/2006 | Adya et al. | 455/456.2 |
| 2006/0281470 A1* | 12/2006 | Shi et al. | 455/456.2 |
| 2007/0030824 A1* | 2/2007 | Ribaudo et al. | 370/328 |
| 2007/0268911 A1* | 11/2007 | Alve | 370/395.52 |
| 2008/0222701 A1* | 9/2008 | Saaranen et al. | 726/3 |
| 2009/0175615 A1 | 7/2009 | Kobayashi et al. | |
| 2009/0264137 A1 | 10/2009 | Soliman | |
| 2009/0286549 A1* | 11/2009 | Canon et al. | 455/456.1 |
| 2009/0310585 A1* | 12/2009 | Alizadeh-Shabdiz | 370/338 |
| 2010/0210287 A1* | 8/2010 | De Vries et al. | 455/456.3 |
| 2010/0287288 A1 | 11/2010 | Driscoll et al. | |
| 2011/0012784 A1* | 1/2011 | Alizadeh-Shabdiz | 342/357.28 |
| 2011/0241872 A1* | 10/2011 | Mahaffey | 340/539.13 |
| 2011/0312345 A1 | 12/2011 | Nam | |
| 2012/0184301 A1* | 7/2012 | Jovicic et al. | 455/456.5 |
| 2012/0196616 A1 | 8/2012 | Edge | |
| 2012/0244884 A1* | 9/2012 | Lim et al. | 455/456.2 |
| 2012/0320815 A1* | 12/2012 | Massena | 370/313 |
| 2013/0163440 A1* | 6/2013 | Issakov et al. | 370/246 |
| 2013/0165142 A1* | 6/2013 | Huang | 455/456.1 |

FOREIGN PATENT DOCUMENTS

| | | |
|---|---|---|
| WO | WO-0158098 | 8/2001 |
| WO | WO-2012109446 | 8/2012 |
| WO | WO-2013158401 | 10/2013 |

OTHER PUBLICATIONS

Hemmes, et al., "Cooperative Localization in GPS-Limited Urban Environments", Retrieved at <<http://www.nd.edu/~ccl/research/pubs/teamtrak-adhocnets09.pdf>>, Ad Hoc Networks, Lecture Notes of the Institute for Computer Sciences, Social Informatics and Telecommunications Engineering, vol. 28, Springer Berlin Heidelberg, Apr. 30, 2010, pp. 9.

Taylor, et al., "Bringing location to IP Addresses with IP Geolocation", Retrieved at <<http://ojs.academypublisher.com/index.php/jetwi/article/download/jetwi0403273277/5236>>, The Journal of Emerging Technologies in Web Intelligence, vol. 4, No. 3, Aug. 2012, pp. 5.

"Challenges in Determining User Location", Retrieved at <<http://developer.android.com/guide/topics/location/strategies.html#Challenges>>, Oct. 6, 2012, pp. 7.

Bajaj, et al., "GPS Location-Tracking Technology", Retrieved at <<http://ieeexplore.ieee.org/stamp/stamp.jsp?tp=&arnumber=993780>>, IEEE Computer, vol. 35, Issue.4, Apr. 2002, pp. 3.

"International Search Report and Written Opinion", Application No. PCT/US2014/012837, Jul. 21, 2014, 10 pages.

"Search Report", GB Application No. 1301440.2, May 12, 2014, 4 pages.

\* cited by examiner

DETERMINING A LOCATION OF A MOBILE USER TERMINAL

RELATED APPLICATION

This application claims priority under 35 USC 119 or 365 to Great Britain Application No. 1301440.2 filed Jan. 28, 2013, the disclosure of which is incorporate in its entirety.

BACKGROUND

Localization refers to determining the location of a mobile user terminal such as a mobile phone, tablet or laptop computer, typically in terms of geographic position relative to the surface of the earth.

Various location technologies are known for performing localization. One type of location technology is satellite based positioning, for example GPS (Global Positioning System) (including variants such as assisted GPS or differential GPS), GLONASS (Global Navigation Satellite System) or Galileo. Another type is based on trilateration or multilateration from base stations of a mobile cellular network, for example E-OTD (Enhanced Observed Time Difference) or OTDOA (Observed Time Difference of Arrival). Other types include systems which work by reference to a known location of an access point of a WLAN (wireless local area network), perhaps also taking into account signal strength received from the access point; and systems such as Geo IP based on a mapping between network addresses and geographic locations.

Each technology has its own limitations, and any given system may or may not be available to a given mobile terminal at any given time, or for other reasons may or may not be fully exploited by a given mobile terminal.

SUMMARY

According to the disclosure herein, information on the geographical location of a first mobile user terminal is determined at least in part based on the geographical location of a second mobile user terminal, which in embodiments may be thought of as acting as an "anchor" if its location is considered to be known to a suitable degree. For example the second mobile user terminal acting as the anchor may use a location technology (e.g. GPS) which in embodiments the first, target terminal may not have access to, or for some other reason may not be currently using. If the first and second terminals are found to be co-located with one another (within a certain proximity) based on some other technology, then the location technology used by the second, anchor terminal can be used to determine or supplement the information on the geographic location of the first, target user terminal.

In order to find whether the first and second terminals are sufficiently co-located to do this, reference is made to a property of a packet-switched network to which both the first and second user terminals are operable to connect. For example the two terminals may be considered to be co-located within a suitable proximity if they both connect to the same a sub network, connect to the same network interface address and/or share a common address space. Alternatively or additionally the proximity may be determined based on a number of network hops between the two terminals, and/or on a transmission time (e.g. round trip time) for one or more packets travelling between the terminals. Thus by exploiting information about the intermediate packet-switched network, it is possible to determine information on the relative location of the first and second mobile user terminals and thereby determine whether it is appropriate to base the geographic location information for one terminal on the geographic location of the other.

In embodiments, the processes of determining the location of the second, anchor terminal, determining the relative proximity and/or determining the location of the first, target terminal may be implemented in the first or second user terminals themselves, and/or at another network element such as a server.

BRIEF DESCRIPTION OF THE DRAWINGS

For a better understanding of the present disclosure and to show how in embodiments it may be put into effect, reference is made by way of example to the accompanying drawings in which.

DETAILED DESCRIPTION

Disclosed herein is a method and apparatus for determining or modifying location information for a device using information received from another device. "Absolute" location information may be provided from the other device, such as a GPS device, to the target device, wherein each device is within the proximity of an anchor device (or serves as the anchor device) such that the receiving device can adapt its current location information.

Figure 1:
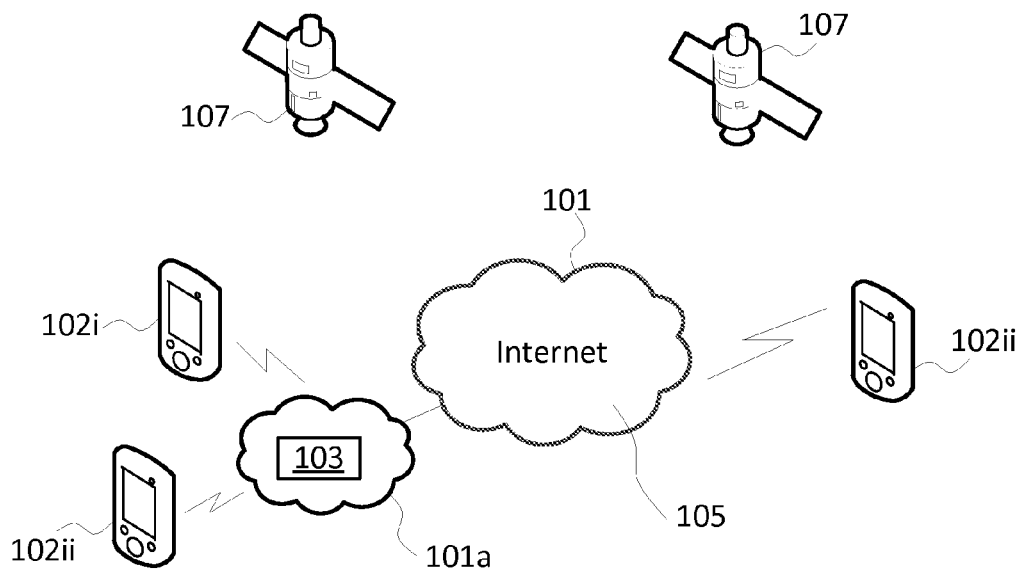
FIG. 1 is a schematic representation of a mobile communication system.

FIG. 1 gives a schematic example of a communication system in which embodiments of the localization techniques disclosed herein may be deployed. The system comprises a first device in the form of a first mobile user terminal 102$i$ and a second device in the form of a second mobile user terminal. Each of the mobile user terminals 102 may be any user terminal capable of mobile communications, such as a mobile phone, tablet or laptop computer. For instance in an exemplary use case the first mobile user terminal is a laptop computer and the second mobile user terminal is a mobile phone or tablet. It will be appreciated that the system may comprise many other mobile terminals, but for conciseness only these two are discussed here.

The system also comprises a packet-switched network 101 which may take the form of a wide-area inter network such as the Internet, or alternatively a private network. The packet-switched network 101 may comprises a sub network 101$a$ such as a wireless such network, e.g. a wireless local area network (WLAN), comprising wireless network equipment 103 by which the mobile user terminals 102 can access the wireless sub network and the wider network. For example the wireless equipment may comprise a wireless access point such as a wi-fi access point (e.g. providing coverage within a café, bar, shop, mall or other retail complex, or railway or bus station, airport or other transport hub); or a wireless router providing coverage in the home (e.g. covering a single home or an apartment block or complex) or office (e.g. covering a single office or company or a plurality of offices or companies within a block or complex).

Alternatively or additionally, the packet-switched network 101 comprises other network equipment 105 such as wired switches and routers, and/or other wired or wireless sub networks. For example the packet-switched network 101 may comprise another wireless sub network or a cellular network via which one or more of the user terminals 102, e.g. the second mobile user terminal 102*ii*, may connect to the wider network.

In one implementation, at least the second mobile user terminal 102*ii* is equipped to use at least one location technology, e.g. a satellite based positioning system such as GPS. One or both of the first and second mobile user terminals 102*i*, 102*ii* may also be equipped to use a different location technology, e.g. a technology based on a mapping between addresses of the packet-switched network 101 and geographic locations. One example of this type of localization is GeoIP which maps IP addresses to geographic locations and thus enables an approximate geographic location (e.g. country and region) of a user terminal to be determined based on its IP address. One or more alternative or additional location technologies which either or both of the first and second mobile user terminals may be equipped to use include the following. One type is trilateration based localization (or more generally multilateration) whereby a geographic location of a mobile terminal is estimated from the timing of signals transmitted between the mobile terminal and a plurality of different wireless base stations or access points having known locations, e.g. the base stations of a mobile cellular network such as a 3GPP network. Examples of this type of localization include E-OTD and OTDOA. Another type of localization is based on a mapping between the identity and a known location of a wireless base station or access point such as a wi-fi or other WLAN access point to which the mobile terminal is currently connected or within range of, e.g. being determined by looking up the location in a localization. In this case the location of the access point can be taken as an approximation of the location of the mobile terminal in question, or signal strength or other factors can be taken into account to try to better estimate or put an error on the location.

In embodiments the second user terminal 102*ii* is equipped to use a location technology—i.e. a type of localization—that the first mobile user terminal 102*i* may not be equipped to use, or that the first mobile user terminal may otherwise be currently without use of. For instance in an exemplary use case the second user terminal 102*ii* is arranged to use GPS to determine its current location, whilst the first terminal 102*i* does not—either because it is not equipped to do so, cannot currently see enough GPS satellites to get a fix on its location, or currently has GPS disabled (e.g. to save battery life). In embodiments the first terminal 102*i* may only have use of an alternative location technology, e.g. GeoIP. Alternatively the first terminal 102*i* may have not have use of any location technology. The second terminal 102*ii* may or may not also have use of one or more of the alternative location technologies such as GeoIP.

Figure 2:
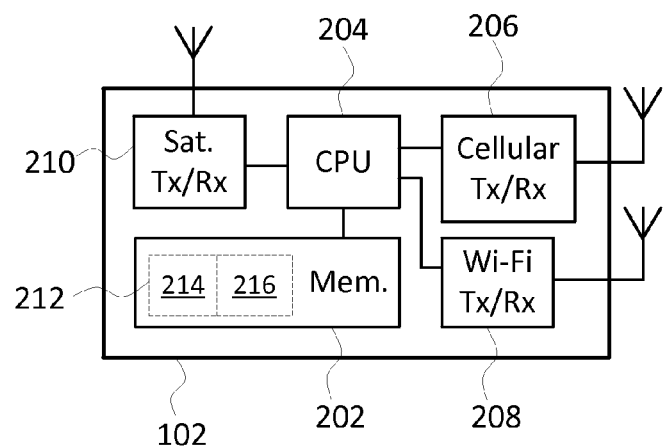
FIG. 2 is a schematic block diagram of a mobile user terminal.

FIG. 2 is a schematic block diagram of a mobile user terminal 102 as might be instantiated by the first and/or second user terminals 102*i*, 102*ii*. The mobile user terminal 102 comprises a processor 204 in the form of a central processing unit (CPU) comprising one or more cores or execution units, and storage 202 in the form of a memory comprising one or more memory devices comprising one or more storage media (e.g. a magnetic storage medium such as a hard disk or electronic storage such as EEPROM or "flash" memory). The mobile user terminal 102 also comprises one or more wireless transceivers, in embodiments comprising a cellular transceiver 206 for connecting to the packet-switched network 101 via a mobile cellular network such as a 3GPP network (parts of which may form part of the equipment 105 of the packet-switched network 101), and/or a local wireless transceiver 108 such as a wi-fi transceiver for connecting to the packet switched network 101 via one or more wireless access points 103 of one or more sub networks 101*a* of the packet-switched network (again at least in part forming some of the equipment of the packet-switched network 101).

The memory 202 stores computer-readable code arranged to be executed on the processor 204. This includes localization code 212 configured to determining a geographic location of the mobile terminal 102 on which it is executed. In embodiments, at least the second mobile terminal 102*ii* comprises a GPS transceiver 210. The first mobile terminal 102*i* may or may not have an instance of the GPS transceiver 210, and if it does then in certain circumstances it may be disabled (e.g. to save battery) or use of it may be unavailable (e.g. being in view of an insufficient number of satellites).

In embodiments, at least the localization code of the first mobile user terminal 102*i* comprises a decision processing module 214 and a location processing module 216, the operation of which will be described in the following.

Due to the difference in availability or use of one or more location technologies, the second mobile user terminal 102*ii* may be able to determine its geographic location within a desired accuracy, whilst the first mobile user terminal 102*i* may not. In this sense the second terminal 102*ii* may be considered an "anchor" device which is associated with an "absolute" location. E.g. the second terminal has an unambiguous GPS fix whereas the first terminal 102 does not. As we know (or can know, or can ask) the absolute location of the "anchor" device, we are able to augment or improve the location of one or more of the other devices. This can be achieved through a combination of what the other devices know (e.g. a mobile phone may have GPS, another device may only have GeoIP data). Based on the connection to/with the anchor device it is possible to improve on or validate the location implied by these data points. In the following examples the second mobile user terminal 102*ii* may be referred to as the anchor device and the first mobile user terminal 102*i* may be referred to as the target device, whose geographic location is to be determined or improved upon using information about the location of the anchor device.

Further, in order to determine whether the first, target terminal 102*i* and the second, anchor terminal 102*ii* are suitably co-located to share geographic information in this manner, it is possible to exploit knowledge of the network to which both the terminals 102*i*, 102*ii* are connected. That is, the system exploits the fact that at least some portion of the network 102*a* provides an infrastructure that is fixed, or at least can be assumed to be substantially fixed relative to the target and anchor terminals 102*i*, 102*ii*. For example if it is known that the target terminal is substantially co-located with a part of the network 101*a* such as a sub network 101*a* corresponding to an access point 103, and the anchor terminal 102*ii* is also known to be co-located with that same sub network 101*a*, and it is assumed that the sub-network provides a fixed frame of reference, then it can be determined appropriate to base the geographic information for the target terminal 102*i* on the geographic location of the anchor terminal 102*ii*.

In an example use case, a user has both a mobile phone 102*ii* and laptop computer 102*i* connected to a home router 103. The mobile phone is somewhere about the house or flat while the user is currently using the laptop. On the laptop, the user is using an application which uses information on a location of the device it is running on, e.g. a map application. However, the laptop 102*i* may not be equipped with GPS, but the mobile terminal 102*ii* may be. In this case the mobile phone can act as the anchor device 102*ii* and the laptop is the target device 102*i*. The two devices may be able to find each other because they are on the same local network 101*a*, and/or because the identity or address of the mobile phone 102*ii* has been preconfigured at the laptop 102*i* as a potential anchor device. Further, the target device can exploit the fact that the router 103 of sub-network 101*a* can be assumed to be a fixed reference point for the two devices, and thereby determine that it is substantially co-located with the anchor device 102*ii* (e.g. in the same apartment or building) to base its geographic location information on that of the anchor terminal 102*ii*. The decision to do this may also be based on the fact that the two devices are logged in with a same user ID, and therefore both belong to the same user.

In another example use case, consider two friends who live in the same building or complex (e.g. same apartment block) or frequent one or more of the same places (e.g. often visit the same bar, station or mall). Each has a respective mobile terminal 102*i*, 102*ii* which connect to the same access point 103. The two terminals may be able to find each other because they have are on the same local network 101*a*, and/or because the two friends have already preconfigured the identity or addresses of one another's terminals 102*i* and 102*ii* as being available to form a potential anchor-target relationship. Again, the target terminal 102*i* may exploit the fact that the access point 103 of sub-network 101*a* can be treated as a fixed reference point, and thereby determine that it is substantially co-located with the anchor device 102*ii* (e.g. in the same shop, bar, mall etc.) to base its geographic location information on that of the anchor terminal 102*ii*. The decision to do this may also be based on the two devices exchanging an authentication token such as a passcode entered by both users, or an authentication key.

Figure 3:
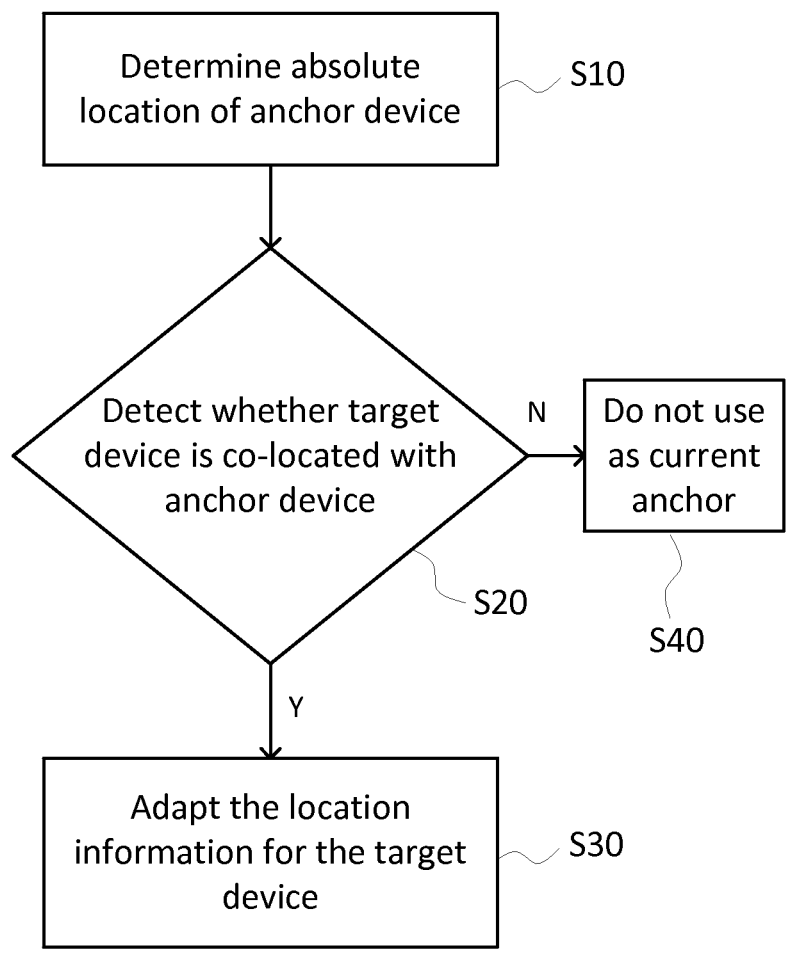
FIG. 3 is a flow chart schematically illustrating a method of locating a mobile user terminal.

FIG. 3 shows a schematic flow chart of a method that may be implemented in the localization code 212 run on the first, target terminal 102*i*.

At step S10 the absolute geographic location of the second, anchor terminal 102*ii* is determined. In embodiments this step may be performed by the localization software 112 on the anchor terminal 102*ii*. This may for example be achieved using GPS via the GPS transceiver 210, or a combination of GPS and GeoIP.

At step S20 it is detected that the first device is co-located with a second device—this may be achieved by determining that the first and second device are connected to the same network. In embodiments this step may be performed by the decision processing module 114 of the localization software 112 on the target terminal 102*i*.

In embodiments Step S10 and S20 can occur in parallel or in the opposite order. In fact one or both of the processes of determining the location of the anchor terminal 102*ii* and checking for co-location with the target terminal 102*i* may be repeated in an ongoing fashion, e.g. periodically.

At step S30, based on detecting that the target and anchor devices 102*ii* are co-located, the location of the anchor device 102*ii* is used to determine or adapt the location of the target device. In embodiments this step may be performed by the location processing module 116 of the localization software 112 on the target terminal 102*i*.

Some example embodiments for implementing step S20 are described in further detail below.

Where two devices 102*i*, 102*ii* share a common external IP address (e.g. public IP, or are on the same private network in the context of IPv6) it may be assumed that they are on the same network. For a consumer this means that they are likely to be co-located geographically.

Where communication can be established between these devices (whether directly or with cloud assistance), this may provide a further validation in that these devices may be considered to have a degree of 'implicit trust' (although to a lesser degree in the case where cloud assistance is required).

For example in the case where an apartment block shares a common internet connection it is possible (and increasingly likely) that there might be devices sharing a common network but which are in different apartments; but more likely that two devices which can connect to each other are on the same internal network.

Consider:—
  (A) where a direct single hop IP connection can be made then likely they are on the same network and segment,
  (B) where the devices share the same subnetwork (addressing space) then likely they are on the same network and segment,
  (C) where the devices connect to a device with a common MAC interface address then likely they are on the same network and segment (in these cases with a high degree of probability); or
  (D) Where the devices are able to connect to each other (multi-hop), but directly they are likely on the same network—e.g. two devices on a small wireless LAN having two routers (in this case with a lower degree of probability).

One or more of these tests may also be combined with a shared token (either common user identity, passcode (as with Bluetooth), cryptographic key or other shared element—such shared key being prompted as a result of detection of any of the criteria (A) to (D) above; then it can be assumed that there is a trust relationship.

At this point, in embodiments the re-occurrence of (A) to (D) (where the anchor device is deemed to be a static device type) may provide the relative positioning information.

Specifically in cases (A) and (B) then (in the consumer case) the presence of the anchor device provides additional accuracy over and above (for example) a corporate network; where for example two offices in different countries may appear to the external world (public network) with a common address. In effect the anchor is enabling (in an exposed way) limited exposure of the internal network and topology—even where a Network Address Translation or Firewall hides the internal network.

There is an additional option which is available to further refine the relative location dimension—which is the time taken for a packet to traverse the network between the two devices. In this context:—
  (E) a simple RTT (round trip time) between the two devices provides a proxy for distance;
  (F) this may be further refined by making allowances for intermediate devices (e.g. routers, switches etc.)—who's impact can be calculated; and/or
  (G) the relative difference in time in RTT between the two devices and a fixed third point (assuming a common egress/ingress to the shared network defined above there is no real point in triangulating using two fixed external points) where a common RTT would increase probability of co-location;

Additionally, the fact that there may be multiple shared network paths between two devices using different network media, i.e. different types of access technology. For example wired, wireless LAN, personal area network (e.g. Bluetooth) and potentially other techniques might be used to further increase certainty. For instance:
  (H) if the two devices are in range of one another via an ad-hoc access technology like Bluetooth, as well as being on the same WLAN (e.g. Wi-Fi), this may indicate they are more likely to be close to one another than if only able to connect on the WLAN.

In embodiments any one or a combination of the above tests may be applied. The tests may be determined for example by the decision module 114 of the target terminal 102*i* querying the anchor terminal 102*ii*, or by querying a network element such as a server which has record of the relevant information about the anchor terminal (e.g. the fact that it connects to the same sub network, and/or its IP address, etc.).

With regard to step S30—adapting the location of the target device—in embodiments this may comprise replacing any previously estimated location of the target device 102*i* with the newly discovered location of the anchor device 102*ii*, on the basis that the anchor device's location technology is understood to be more accurate than that of the target device itself. For example, if the target device 102*i* only has GeoIP while the anchor device 102*ii* has GPS, the previous location estimate determined by the target device 102*i* alone (e.g. just given as the name of a town) is replaced with the new location estimate determined from the anchor device 102*ii* (e.g. in terms of GPS coordinates and an error radius). In embodiments the decision module 114 may be configured to compare the available location technologies of the anchor and target devices (being preconfigured with relative accuracy ranking of two or more different types of location technology), and replace the target devices own location estimate on condition of determining that the anchor device has a more accurate estimate available.

In alternative embodiments, the adapting of the location at step S30 may comprise combining the previous location estimate determined by the target device 102*i* itself with the newly discovered location determined from the anchor device 102*ii*, e.g. by determining the union of the two. For example, say the target device 102*i* knows from its own IP address that it is located within a certain company campus, and therefore is within a region having certain bounds or a "geo fence" on a map. If it then also obtains a GPS reading via the anchor device 102*ii*, this may give another region or "fence" within which the target device 102*i* is expected to be found, this time defined by a GPS point (set of GPS coordinates) and an approximate error around that point. If the known area of the campus on a map overlaps with the GPS error region, but one does not necessarily fall entirely within another, then it is possible to estimate that the target device 102*i* is found within the intersection of the two, thus giving a more specific location estimate than using either of the two location technologies alone.

It will be appreciated that the above embodiments have been described only by way of example.

In alternative implementations, either or both of the decision module 114 and location module 116 could be implemented at a server. For example the server may be arranged to receive information such as the IP addresses of the target and anchor devices 102*i*, 102*ii* or an identifier of the sub-network to which they connect (e.g. an ID of the access point or router 103), and to make the decision as to co-location centrally. This decision may then be sent to the target terminal, or the server may also be configured to receive location information from the anchor device 102*ii* and also perform the location determination for the target terminal centrally. Alternatively one or both of these functions could be implemented at the router or access point 103. Further, the above has been described in terms of software modules 212, 214, 216, but it is not excluded that any of these modules is implemented at least in part by dedicated hardware.

Further, the anchor device 102*ii* need not be a mobile user terminal but could be another type of user terminal having a fixed location such as a desktop computer. In such embodiments, the anchor device need not necessarily be equipped with GPS or the like, but rather may have a known location registered in a database of a location service provided by a third party. In this case, the target device 102*i* may determine the location of the anchor device 102*ii* from this database, e.g. accessing it via the internet.

In embodiments the system is not limited to just two devices 102*i* and 102*ii*, but may use an anchor device to estimate the location of a plurality of target terminals, and/or use a plurality of anchor devices to determine the location a given target terminal.

Various embodiments can be used to determine the location of a target device that has no location information of its own. However, in other embodiments the location information from the anchor device (e.g. GPS location information) is used not just to provide a location to a device without any location information of its own, but rather to refine the location information the target device, the target's location information having been initially determined by a different technology—different type of localization—than used by the anchor device. For example the target device is only able to determine its location using GeoIP or trilateration, while the anchor device can determine its location using GPS. In this case the first terminal (or other element such as a server) determines whether it is suitably co-located with the anchor device, and if so determines whether the location information available to it using its own, first location technology (e.g. GeoIP or trilateration) is less accurate than that now available to it from the second location technology of the anchor terminal (e.g. a satellite based positioning system such as GPS). If it determines that the second technology is likely to give a more accurate result, it supplements its own initial location information with that determined based on the anchor device—either by replacing it or aggregating the information. The accuracy may be compared for example based on a predetermined knowledge of the relative capabilities of the two technologies, or based on an indication of an error level received from the anchor device.

Hence in embodiments there may be provided apparatus comprising: a decision processing module arranged to determine whether a first mobile user terminal and a second mobile user terminal are within a relative geographic proximity of one another in dependence on a relative location technology; and a location processing module arranged to obtain a geographic location information for the first mobile user terminal based on a first location technology, and to obtain a geographic location of the second mobile user terminal wherein the geographic location of the second mobile user terminal is based on a second location technology. The decision processing module may be configured, on condition that the first and second user terminals are determined to be within said proximity, to use the geographic location of the second mobile user terminal to modify the geographic location information for the first mobile user terminal. This modification may comprise replacing or augmenting the geographic location information for the first mobile user terminal. The decision processing module may be configured to perform said modification on condition of determining that the second location technology provides is more accurate than the first location technology.

In yet further embodiments, it is possible for the devices to make a determination using environmental data (which would need to be compared in the cloud, or fingerprints of the environment exchanged between the devices)—an example here would be that both devices sample the sound from their surroundings by sampling the sound the pattern of sound can be compared using peaks and troughs in sound and an accurate time reference to correlate the 'environments' around the devices. Alternatively the anchor device could introduce a sound into the environment which the target device attempts to detect, or vice versa. If the one device can hear the other, they may be determined to be co-located.

Thus in embodiments, proximity between a first user terminal and a second mobile user terminal may be determined based on sound data common to the first and second mobile terminals, and detected by one or both of the two mobile user terminals—either a sound profile of the environment in which the first and second mobile user terminals are located, or a sound deliberately emitted into the environment by one of the first and second mobile user terminals to be detected by the other.

In the first case, each of the first and second user terminals captures sound data from its surroundings and the sound data from the two are compared (at either terminal or another network element such as a server). The sound could be an incidental ambient sound such as background music or background conversation, or a sound deliberately introduced into the environment by another element for that purpose, e.g. a sound signature emitted by the router or access point. If the sound detected by the first and second terminals is found to be sufficiently similar, e.g. based on a correlation or pattern matching algorithm, then it may be determined that the terminals are likely to be in the same environment (e.g. same room) and therefore in effect co-located to within an acceptable degree of proximity. In embodiments the geographic location information for one terminal may then be determined at least in part based on the geographic location of the other.

In the second case one of the first and second mobile user terminals deliberately emits a sound signature into the environment, and the other of the first and second mobile user terminals determines whether it can detect the signature, e.g. by matching to a predetermined instance of the signature stored at that terminal. If so it may be determined that the terminals are likely to be in the same environment (e.g. same room) and therefore in effect co-located to within an acceptable degree of proximity. Again, in embodiments the geographic location information for one terminal may then be determined at least in part based on the geographic location of the other.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
   a decision processing module configured to determine whether a first mobile user terminal and a second user terminal are within a relative geographic proximity of one another in dependence on at least one property associated with intermediate network equipment of a packet-switched network to which the first mobile user terminal and second user terminal are operable to connect, the at least one property comprising a transmission time of a packet travelling between the first mobile user terminal and second user terminal via said intermediate network equipment, the decision processing module further configured to remove from said transmission time a delaying effect of one or more switches and/or routers in the intermediate network equipment, the relative geographic proximity of the first mobile terminal and second user terminal being determined in dependence on the transmission time after removal of said delaying effect; and
   a location processing module configured to obtain a geographic location of the second user terminal and, on condition that the first mobile user terminal and second user terminal are determined to be within said relative geographic proximity, to use the geographic location of the second user terminal in estimating a geographic location of the first mobile user terminal.

2. The apparatus of claim 1, wherein said at least one property further comprises an indication of a sub network comprising said intermediate network equipment, and wherein the decision processing module is further configured to determine the first mobile user terminal and second user terminal are within said relative geographic proximity based, at least in part, on a condition that the first mobile user terminal and second user terminal are both connected to said sub network.

3. The apparatus of claim 1, wherein said at least one property further comprises an address space for terminals connecting to the packet-switched network via said intermediate network equipment, the address space being a subset of addresses of the packet-switched network, wherein the decision processing module is further configured to determine the first mobile user terminal and second user terminal are within said relative geographic proximity based, at least in part, on a condition that the first mobile user terminal and second user terminal share said address space.

4. The apparatus of claim 1, wherein said at least one property further comprises a number of hops between the first mobile user terminal and second user terminal via the intermediate network equipment, wherein the decision processing module is further configured to determine the first mobile user terminal and second user terminal are within said relative geographic proximity based, at least in part, on a condition that the first mobile user terminal and second user terminal are separated by no more than a threshold number of hops.

5. The apparatus of claim 4, wherein said threshold is a single hop.

6. The apparatus of claim 1, wherein said at least one property further comprises a network interface address of the intermediate network equipment, wherein the decision processing module is further configured to determine the first mobile user terminal and second user terminal are within said relative geographic proximity based, at least in part, on a condition that the first mobile user terminal and second user terminal both connect to said network interface address.

7. The apparatus of claim 1, wherein the transmission time comprises a round-trip time from one of the first mobile user terminal and second user terminal and back again.

8. The apparatus of claim 1, wherein the decision processing module is further configured to determine whether the first mobile user terminal and second user terminal are within said relative geographic proximity in dependence on a type of access technology currently available for communicating between the first mobile user terminal and second user terminal.

9. The apparatus of claim 1, wherein the decision processing module is further configured to determine whether the first mobile user terminal and second user terminal are within said relative geographic proximity in further dependence on a shared authentication element of the first mobile user terminal and second user terminal.

10. The apparatus of claim 9, wherein the authentication element comprises one or more of: a user identity, a pass code, and a cryptographic key.

11. The apparatus of claim 1, wherein the apparatus is implemented at the first mobile user terminal and is further configured to obtain the geographic location of the second user terminal from the second user terminal.

12. The apparatus of claim 1, wherein:
the location processing module is further configured to estimate the geographic location of the first mobile user terminal using a first location technology, the geographic location of the second user terminal being based on a second geographic location technology; and
the position processing module is configured to use the geographic location of the second user terminal to supplement the estimation using the first geographic location technology.

13. The apparatus of claim 12, wherein the first mobile user terminal does not use the second geographic location technology.

14. The apparatus of claim 13, wherein the second geographic location technology uses a satellite based positioning system, whereas the first location technology uses a location technology that is different from the satellite based positing system.

15. The apparatus of claim 1, wherein the network equipment is at a fixed location.

16. The apparatus of claim 1, wherein the second user) terminal is a mobile user terminal.

17. One or more computer readable storage memory devices comprising code configured to, responsive to execution by one or more processors, perform operations comprising:
determining whether a first mobile user terminal and a second mobile user terminal are within a relative geographic proximity of one another, in dependence on at least one property associated with intermediate network equipment of a packet-switched network to which the first mobile user terminal) and second mobile user terminal are operable to connect, the at least one property comprising a transmission time of a packet travelling between the first mobile user terminal and second mobile user terminal via said intermediate network equipment, the determining further comprising removing from said transmission time a delaying effect of one or more switches and/or routers in the intermediate network equipment, the relative geographic proximity of the first mobile user terminal and second mobile user terminal being determined in dependence on the transmission time after removal of said delaying effect;
obtaining a geographic location of the second mobile user terminal; and
on condition that the first mobile user terminal and the second mobile user terminal are determined to be within said relative geographic proximity, using the geographic location of the second mobile user terminal in estimating a geographic location of the first mobile user terminal.

18. A computer-implemented method comprising:
determining whether a first mobile user terminal and a second mobile user terminal are within a relative geographic proximity of one another, the first and second mobile user terminals being determined to be within said relative geographic proximity based, at least in part, on at least one property associated with intermediate network equipment of a packet-switched network to which the first and second mobile user terminals are operable to connect, the at least one property comprising a transmission time of a packet travelling between the first mobile user terminal and second mobile user terminal via said intermediate network equipment, the determining further comprising removing from said transmission time a delaying effect of one or more switches and/or routers in the intermediate network equipment, the relative geographic proximity of the first mobile user terminal and second mobile user terminal being determined in dependence on the transmission time after removal of said delaying effect;
obtaining a geographic location of the second mobile user terminal using a satellite positioning system, wherein the first mobile user terminal is not equipped with access to any satellite based positioning system; and
on condition that the first mobile user terminal and second mobile user terminal are determined to be within said relative geographic proximity, using the geographic location of the second mobile user terminal in estimating a geographic location of the first mobile user terminal.

19. The computer-implemented method of claim 18, wherein the at least one property further comprises a property associated with the first user mobile terminal and the second mobile user terminal being connected to a same wireless router or a same access point of a wireless local area network providing access to a packet-switched network.

20. The computer-implemented method of claim 19, wherein the determining further comprises determining whether the first mobile user terminal and second user terminal are within said relative geographic proximity based, at least in part, on a shared authentication element of the first mobile user terminal and second user terminal.

* * * * *